3,649,636
PROCESS FOR PRODUCING CYCLIC NITRILE SULFITES
Emmett H. Burk, Jr., Glenwood, Ill., and Donald D. Carlos, Middletown, Ky., assignors to Atlantic Richfield Company, New York, N.Y.
No Drawing. Continuation-in-part of application Ser. No. 850,336, Aug. 11, 1969, which is a continuation of application Ser. No. 603,454, Dec. 21, 1966. This application Nov. 13, 1969, Ser. No. 876,593
Int. Cl. C07d 95/00
U.S. Cl. 260—301
11 Claims

ABSTRACT OF THE DISCLOSURE

A cyclic nitrile sulfite compound of the general formula:

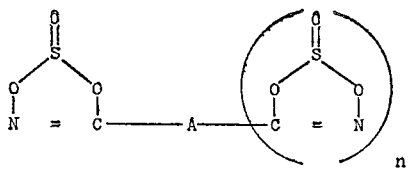

wherein $n$ is 0 to 2 and A is aromatic hydrocarbon having 1 to 3 aromatic rings, up to 30 carbon atoms, and no acetylenic or ethylenic unsaturation, the cyclic nitrile sulfite groups being directly attached to aromatic ring atoms of A, is prepared by addition reacting sulfur dioxide with a nitrile oxide compound of the general formula:

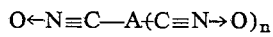
$$O \leftarrow N \equiv C - A(C \equiv N \rightarrow O)_n$$

wherein A and $n$ are as defined above. The cyclic nitrile sulfite compound is useful as, for example, an isocyanate generator. Thus, it can be thermally decomposed to an isocyanate of the general formula:

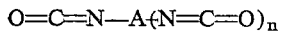
$$O = C = N - A(N = C = O)_n$$

wherein A and $n$ are as defined above.

---

This application is a continuation-in-part of application S.N. 850,336, filed Aug. 11, 1969, which latter application is a continuation of application S.N. 603,454, filed Dec. 21, 1966, both of which are now abandoned.

The present invention is directed to a novel process for making certain aromatic cyclic nitrile sulfite compounds. More particularly, it is directed to the process of making a cyclic nitrile sulfite compound by addition reacting sulfur dioxide with a nitrile oxide group-containing compound.

Cyclic nitrile sulfite compounds which can be prepared by the process of the present invention have the general formula:

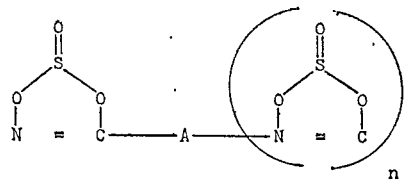

wherein $n$ is 0 to 2 and A is aromatic hydrocarbon having 1 to 3 aromatic rings, up to 30, preferably up to 12, carbon atoms, and no acetylenic or ethylenic unsaturation, the cyclic nitrile sulfite groups of the compounds being directly attached to aromatic ring atoms of A. Where A has 2 or 3 aromatic rings those rings can be either fused, as in the case of naphthalene, or non-fused, as in the case of biphenyl. If there are more than one cyclic nitrile sulfite substituent on A then those substituents can be attached to carbon atoms of the same or of different rings. The aromatic rings of A can also be substituted with alkyl or cycloalkyl groups or both.

Illustrative of cyclic nitrile sulfite compounds which can be prepared by the process of the present invention are those wherein A in the above formula is a residue of benzene or alkylated (including cycloalkylated) benzene, as, for example, in benzene nitrile sulfite, benzene-1,4-di(nitrile sulfite), benzene-1,3,5-tri(nitrile sulfite), p-toluene nitrile sulfite and 1-ethyl-benzene-3-nitrile sulfite; those wherein A is a residue of naphthalene or phenyl-alkylated naphthalene or alkylated derivatives of the foregoing, as, for example, in α-naphthalene nitrile sulfite, 1-propylnaphthalene-4-nitrile sulfite, 2-butylnaphthalene-7-nitrile sulfite, naphthalene-1,4-di(nitrile sulfite), and 7-(phenylisopropyl)naphthalene - 1 , 4-di(nitrile sulfite); those wherein A is a residue of anthracene or alkylated anthracene, as, for example, anthracene-2-nitrile sulfite, anthracene-9-nitrile sulfite, and 1-octylanthracene-5,8-di(nitrile sulfite); those wherein A is a residue of diphenylalkanes or phenylalkylated diphenylalkanes or alkylated derivatives of the foregoing, as, for example, in 2,2-bis(4-(nitrile sulfite) phenyl) propane, bis(2-(nitrile sulfite) phenyl)methane, 2-(2-(nitrile sulfite)phenyl)-2-(4-benzyl-2-(nitrile sulfite)phenyl) propane, 1,3,5-tris(4-(nitrile sulfite)phenyl)pentane, 1 - (4 - cyclohexylphenyl)-2-(3-(nitrile sulfite)phenyl)ethane, and 2-(2-methyl-4-(nitrile sulfite)phenyl)-2-(3,5 - di(nitrile sulfite)phenyl)propane; those wherein A is a residue of biphenyl or phenylalkylated biphenyl or alkylated derivative of the foregoing, as, for example, in biphenyl-4,4'-di(nitrile sulfite) and 3-benzylbiphenyl-5-nitrile sulfite; and those wherein A is a residue of m- or p-terphenyl or alkylated m- or p-terphenyl, as, for example, in 2-dodecyl-p-terphenyl-4,4''-di(nitrile sulfite).

The nitrile oxide compound reacted with sulfur dioxide in accordance with the process of the present invention to produce the cyclic nitrile sulfite compounds is of the general formula:

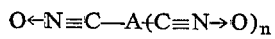
$$O \leftarrow N \equiv C - A(C \equiv N \rightarrow O)_n$$

wherein A and $n$ are as defined above in the formula of the cyclic nitrile sulfite compound produced. Thus, for example, suitable nitrile oxide compounds for use in the process of the present invention include benzene nitrile oxide, benzene-1,4-di(nitrile oxide), benzene-1,3,5-tri(nitrile oxide), etc. When two or more nitrile oxide groups are present on the same aromatic ring, it is usually preferred that they not be in ortho positions with respect to one another.

The nitrile oxide reactant of the process of the invention can be prepared by methods known to the art. For example, the oxime corresponding to the desired nitrile oxide may be chlorinated to produce the hydroxamic chloride which is then followed by treatment with a suitable base such as sodium carbonate, sodium hydroxide, triethylamine and the like to yield the nitrile oxide. Alternatively, the nitrile oxides may be prepared by reacting at least equal molar amounts of the corresponding oxime with an alkali hypohalite at a temperature of from about −10° C. to 25° C. For further descriptions of methods which may be employed to prepare the nitrile oxide reactants of the invention, reference is made to U.S. Pats. Nos. 2,258,397 and 3,213,068, hereby incorporated by reference.

The addition reaction of the nitrile oxide compound and the sulfur dioxide in accordance with the process of the present invention can be represented by the following general equation, wherein A and n are as defined above:

(I)

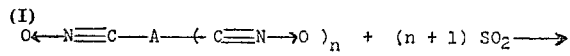
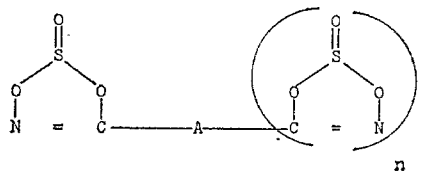

The reaction proceeds quite readily ambient conditions of temperature and pressure. Elevated temperatures—up to just below the decomposition temperature of the desired cyclic nitrile sulfite product—may be used, if desired, to hasten the reaction. Also, sub-ambient temperatures—e.g., as low as about —30° C. or even —50° C.—may be employed if desired. Likewise, sub- or super-atmospheric pressures may also be employed.

The reaction can advantageously be conducted with the nitrile oxide compound being in suspension or solution (preferably the latter) in an inert, organic solvent which is liquid under the reaction conditions. Illustrative of suitable such solvents are normally liquid, oxygen-containing, organic compounds such as carboxylic acid ester solvents, ether solvents (including cyclic ether solvents, e.g., tetrahydrofuran and the dioxanes); normally liquid hydrocarbon solvents such as benzene, the xylenes, toluene, hexane, heptane, and octane; normally liquid halohydrocarbon solvents such as dichloromethane and chloroform; mixtures of the foregoing solvents, etc.

At least a stoichiometric amount—and preferably a large excess over stoichiometric—of sulfur dioxide is contacted with the nitrile oxide compound, that is, a ratio of at least one mole of sulfur dioxide per molar equivalent of nitrile oxide substituent. The sulfur dioxide can be supplied to the reaction mixture in any form. Usually, it will be supplied either as gaseous sulfur dioxide, liquid sulfur dioxide, or a solution of sulfur dioxide in an inert, liquid, organic solvent, e.g., an ether or halohydrocarbon solvent as discussed above for the nitrile oxide compound. Under atmospheric pressure, sulfur dioxide is in liquid form within the temperature range of about —73 to —10° C. Contacting of the reactants can be accomplished by any suitable means; preferably, however, a liquid reaction mixture will be employed, as opposed to, say, contacting dry, powdered nitrile oxide compound with gaseous sulfur dioxide. Thus, for example, where the sulfur dioxide is supplied as a gas, it can advantageously be bubbled through a liquid suspension or solution of the nitrile oxide compound. Alternatively, the nitrile oxide compound can be added to the sulfur dioxide, as, for example, by adding (gradually or all at once) a liquid suspension or solution of the nitrile oxide compound to a pool of liquid sulfur dioxide. Or, if desired, no solvent need be employed and the nitrile oxide compound can simply be slurried in liquid sulfur dioxide.

The reaction is generally over in about one-quarter hour to 2 or more hours, depending upon the particular nitrile oxide reactant selected and the particular reaction conditions utilized. The cyclic nitrile sulfite product can be removed from the resulting solution by any desirable means, for instance by first filtering the resulting solution to remove any unreacted, solid starting material and subjecting the filtrate to reduced pressure to remove unreacted sulfur dioxide and inert solvent, if employed, and provide the cyclic nitrile sulfite compound as a crude product. Purer cyclic nitrile sulfite products can be obtained by utilizing recrystallization techniques as, for instance, from a suitable solvent such as ether, pentane, dichloromethane, carbon disulfide, ethyl acetate, and the like, and mixtures thereof.

A convenient alternative method for obtaining a purer nitrile sulfite product is by extraction or washing with a hydrocarbon solvent. Any normally liquid hydrocarbon solvent can be used for the extraction as, for instance, alkanes of 5 to 15 or more carbon atoms, aromatic solvents such as benzene, xylenes, toluene, chlorobenzene, and the like. A minimum tmount of solvent is employed in the extraction, the actual amount used being dependent upon the particular cyclic nitrile sulfite compound. If desired, a combination of both the recrystallization and extraction methods can be used.

The cyclic nitrile sulfite compounds prepared by the process of the present invention are valuable intermediates or precursors for the preparation of highly desired chemicals. For example, they can be thermally decomposed to mono- and polyisocyanates according to the following general equation, wherein A and n are as defined above:

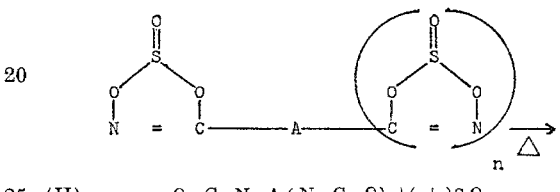

(II)     $O=C=N-A(N=C=O)_n + (n+1) SO_2$

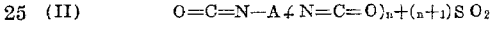

Isocyanates, in turn, can be used in textile treatments, in the preparation of proteinaceous resins, and in the preparation of urethanes, ureido compounds, and other derivatives of various active hydrogen compounds. Aromatic monoisocyanates are useful, for example, for treating various yarns to enhance their dye receptivity, and for reacting with proteins to produce acid and alkali resistant resins. The polyisocyanates, such as diisocyanates, have found extensive use, for example, in the preparation of high molecular weight polymers by reaction of the polyisocyanates with polymerizable organic compounds such as compounds with terminally active hydroxy and amine groups. Polyurethanes, for instance, are commonly prepared by the reaction of diisocyanates and polybasic alcohols such as the glycols. The nitrile sulfites can also be acid hydrolyzed to the corresponding hydroxamic acids. Decomposition of the nitrile sulfites to the corresponding isocyanates can be effected by simply heating the nitrile sulfites to a decomposition temperature below the degradation point of the desired isocyanate product.

The following examples illustrate the preparation of the nitrile oxide reactant employed in the process of the invention.

EXAMPLE I

Preparation of benzene-1,4-di(nitrile oxide)

To a 2-liter, fluted, round bottom flask attached to a CaCl$_2$ drying tube were added 82.1 g. (0.5 mole) of terephthaldehyde dioxime and 1 liter of anhydrous ether. The reaction mixture was maintained at about 0° C. while being mechanically stirred, and chlorine gas was bubbled in at a rate of 1 gram per minute for 1½ hours. The excess chlorine was removed under reduced pressure and the resulting slurry was transferred to a 4-liter separatory funnel containing 233.0 g. (2.20 moles) of Na$_2$CO$_3$ in 500 cc. of H$_2$O. The mixture was shaken occasionally for half an hour. There resulted a pale yellow precipitate which was filtered and dried in a vacuum. This material melted at approximately 255° C., but will decompose at lower temperatures if heated quickly. An infrared spectrum ("Nujol" mull) of the product showed the typical nitrile oxide absorptions at 4.35 and 9.10 microns and showed no change in properties after standing for 1 week.

EXAMPLE II

Preparation of benzene nitrile oxide 12.1 grams (0.10 mole) of benzaldoxime in 150 cc.

of dry CHCl₃ was chlorinated at a rate of 0.5 g. per minute for 15 minutes in accordance with the general procedure of Example I. The chlorine was removed under reduced pressure and the resulting solution was transferred to a separatory funnel containing 10.6 g. (0.10 mole) of Na₂CO₃ in 100 cc. of H₂O. The lower CHCl₃ layer was drawn off and dried over "Drierite" for a few minutes with occasional shaking. The solution contained 11.9 g. (0.10 mole) of benzene nitrile oxide in CHCl₃.

The following examples further illustrate the process of the present invention:

EXAMPLE III

Preparation of benzene-1,4-di(nitrile sulfite)

To a 500 cc., fluted, round bottom flask attached to a CaCl₂ drying tube were added 100 cc. of liquid SO₂ followed by 16.0 g. (0.10 mole) of crude benzene-1,4-di(nitrile oxide) and the slurry maintained at —10 to —15° C. The reaction mixture was mechanically stirred for half an hour at which time the SO₂ was removed under reduced pressure. There resulted 24.6 g. (86%) of benzene-1,4-di(nitrile sulfite), M.P. 136° C. Recrystallization from dichloromethane gave white crystals, M.P. 135.5–136° C. The infrared spectrum ("Nujol" mull), melting point, etc., of this product showed it to be identical in all respects to an authentic sample of benzene-1,4-di(nitrile sulfite) obtained from the reaction of thionyl chloride with benzene-1,4-dihydroxamic acid.

EXAMPLE IV

Preparation of benzene nitrile sulfite

Employing the general procedure of Example III, a CHCl₃ solution of 11.9 g. (0.10 mole) of crude benzene nitrile oxide (prepared by conventional methods) was added dropwise to about 150 cc. of liquid SO₂. The reaction mixture was stirred mechanically and maintained at a temperature of about —30 to —20° C. for 15 minutes beyond the 5 minute addition period. The solvents were removed under reduced pressure to give an oily residue from which benzene nitrile sulfite (61%) was identified by conversion to benzohydroxamic acid.

EXAMPLE V

Preparation of benzene-1,4-di(nitrile sulfite) with gaseous SO₂ reactant

To a 500 cc., fluted, round bottom flask attached to a CaCl₂ drying tube were added 8.0 g. (0.05 mole) of crude benzene-1,4-di(nitrile oxide) and 200 cc. of tetrahydrofuran. The reaction mixture was maintained at 15 to 20° C. by cooling and was mechanically stirred for half an hour, during which time gaseous SO₂ was introduced at a feed rate of approximately 1 gram per minute. Upon removal of the solvents under reduced pressure there resulted 12.4 g. (86%) of benzene-1,4-di(nitrile sulfite), M.P. 130–140° C. (dec.). The infrared spectrum ("Nujol" mull) of the sample was identical to that of an authentic sample of benzene-1,4-di(nitrile sulfite).

It is claimed:
1. A process for the production of a cyclic nitrile sulfite compound having the structure:

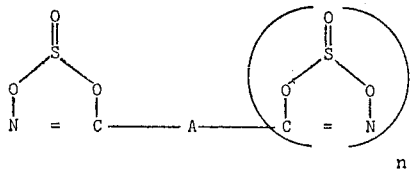

wherein $n$ is 0 to 2 and A is aromatic hydrocarbon having 1 to 3 aromatic rings, up to 30 carbon atoms, and no acetylenic or ethylenic unsaturation, the cyclic nitrile sulfite groups of said compound being attached directly to aromatic ring carbon atoms of A, which comprises addition reacting sulfur dioxide at a temperature below the decomposition temperature of the desired cyclic nitrile sulfite compound with a nitrile oxide compound having the structure:

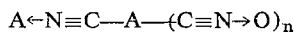

wherein A and $n$ are as defined above, the nitrile oxide groups of said nitrile oxide compound being attached directly to aromatic ring carbon atoms of A.

2. The process of claim 1 wherein A has up to 12 carbon atoms.

3. The process of claim 2 wherein A is a residue of benzene and the nitrile oxide groups are in non-ortho position.

4. The process of claim 3 wherein the nitrile oxide compound is benzene nitrile oxide.

5. The process of claim 3 wherein the nitrile oxide compound is benzene-1,4-di(nitrile oxide).

6. The process of claim 1 wherein the reacting is conducted in a liquid reaction mixture.

7. The process of claim 6 wherein gaseous sulfur dioxide is bubbled through a suspension or solution of the nitrile oxide compound in an inert, liquid, organic solvent.

8. The process of claim 6 wherein the nitrile oxide compound is slurried in liquid sulfur dioxide.

9. The process of claim 6 wherein a suspension or solution of the nitrile oxide compound in an inert, liquid, organic solvent is brought into contact with either liquid sulfur dioxide or a solution of sulfur dioxide in an inert, liquid, organic solvent.

10. The process of claim 1 wherein the reaction temperature is at least about —50° C.

11. The process of claim 10 wherein the reaction temperature is in the range of about —50° C. to ambient temperature.

References Cited

UNITED STATES PATENTS 3,268,542   8/1966   Burk et al. _____ 260—301
3,423,447   1/1969   Carlos et al. _____ 260—301

ALEX MAZEL, Primary Examiner

R. J. GALLAGHER, Assistant Examiner

U.S. Cl. X.R.

260—453 AR, 465 R, 465 H